July 14, 1964   F. ZÖLLNER   3,140,866
SUSPENSION SYSTEM FOR LOCOMOTIVES AND THE LIKE
Filed June 19, 1961
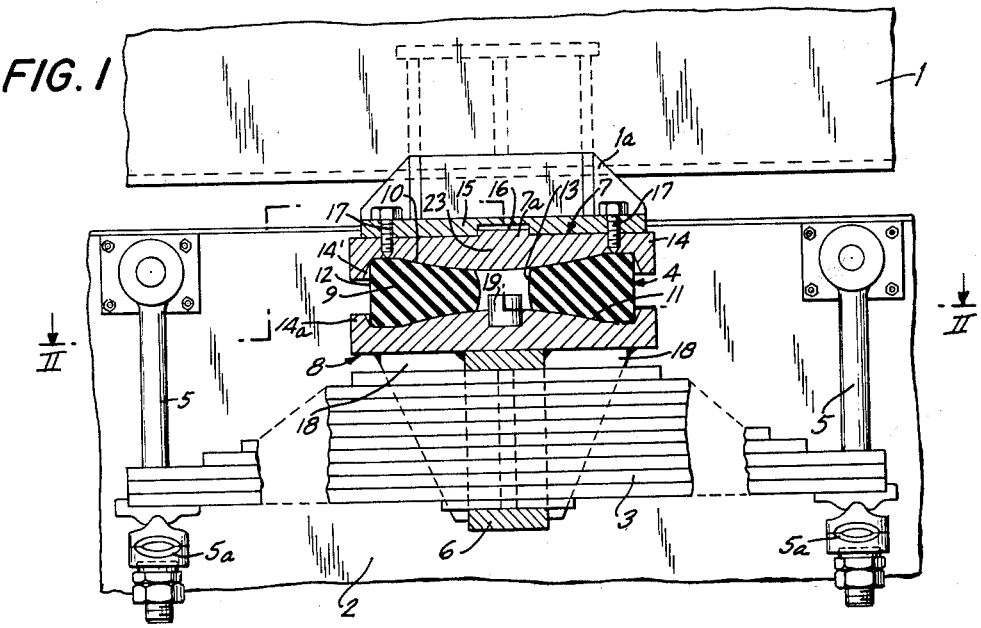
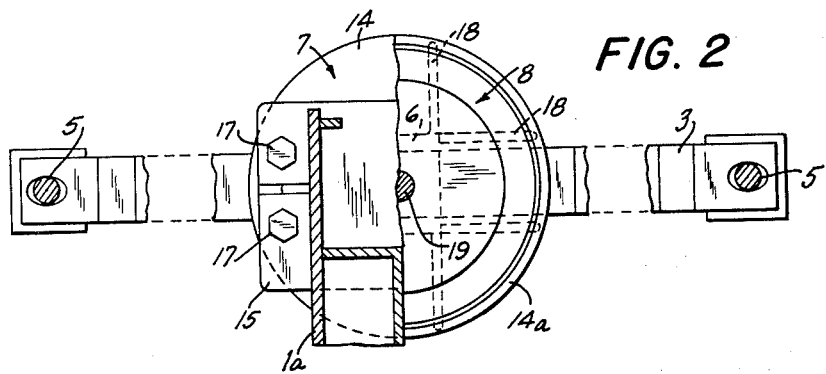
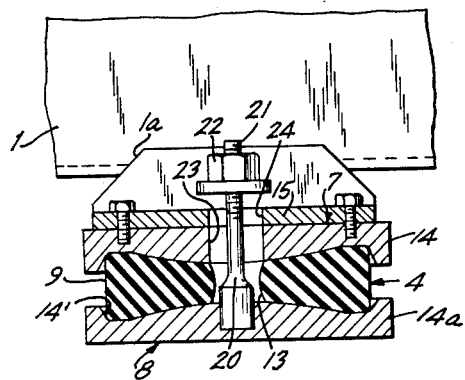
INVENTOR:
FRITZ ZÖLLNER
BY Michael S. Striker
his ATTORNEY

United States Patent Office 3,140,866
Patented July 14, 1964

3,140,866
SUSPENSION SYSTEM FOR LOCOMOTIVES
AND THE LIKE
Fritz Zöllner, Munich-Allach, Germany, assignor to Krauss-Maffei Aktiengesellschaft, Munich-Allach, Germany
Filed June 19, 1961, Ser. No. 118,064
3 Claims. (Cl. 267—3)

The present invention relates to suspension means in general, and more particularly to a bolster or suspension system between a sprung or supported mass and a second or supporting mass which is especially suited for use in subassemblies of rail-mounted conveyances of the swivel-truck running gear type. For example, the suspension means of my invention may find one of its preferred applications as a means for supporting one side of the main frame on the truck of a diesel locomotive.

Known suspension means of this general character comprise a leaf spring which is mounted on the truck and whose clamp is provided with an eye for a bolt which latter is removably secured to the main frame. Whenever it becomes necessary to separate the main frame from the truck, the connecting bolt must be loosened, released and finally removed, and the procedure occurs in reverse when the connection between the truck and the main frame is reestablished. The separation and/or connection of the main frame by means of such suspension means is a tedious and time-consuming operation, particularly since the main frame is extremely heavy and because the eye of the clamp must receive the connecting bolt with minimal play. The connection between the frame and the truck must be established with utmost care and with great accuracy because any damage to the suspension means or any loosening of the bolt could have far-reaching consequences.

An important object of the present invention is to provide a suspension means between a sprung mass and an supporting mass which is constructed and assembled in such a way that the two masses need not be positively connected with each other even though the sprung mass is safely retained in requisite position with respect to the second mass.

Another object of the invention is to provide a suspension means for the main frame of a diesel locomotive or a like conveyance which permits immediate separation of the frame from the truck and which also permits rapid, convenient and accurate repositioning of the frame in suspended position.

A further object of my invention is to provide a suspension means of the above outlined characteristics which may be assembled or taken apart with very little loss in time, and which may be readily installed in many conveyances of presently utilized design without necessitating any or by necessitating only minimal changes in the construction of such conveyances.

An additional object of the invention is to provide a suspension means of the above described type which, though it does not provide a positive connection between the sprung mass and the second or supporting mass, is nevertheless capable of taking up not only compressive but also substantial tangential or shearing stresses which might arise in actual use of the suspension means in a locomotive or the like.

A concomitant object of the invention is to provide a suspension means of the above outlined characteristics wherein the stress-absorbing element or elements are of extremely simple construction and may be readily and rapidly replaced by inexpensive prefabricated elements.

A further object of the invention is to provide a suspension means which automatically limits the deformation of its resilient shock absorbing element or elements to prevent destruction of such elements under excessive stresses.

An additional object of the invention is to provide a suspension means whose shock- and vibration-absorbing action may be adjusted within a wide range.

With the above objects in view, the invention resides in the provision of a suspension means which comprises a weight transmitting member, such as a leaf spring including the customary clamp and having its ends connected to one only of the masses, for example to the supporting mass, a first retaining member which is rigid with the weight transmitting member, a second retaining member which is rigidly secured to the other mass only, and an elastic coupling element which is inserted between the retaining members and is in face-to-face contact therewith. The configuration of the coupling element and of the retaining members is such that the coupling element is capable of taking up compressive as well as tangential or shearing stresses between the retaining members.

Certain other features of the invention reside in special construction of the retaining members, in special mounting of the retaining members, in special mounting of the weight transmitting member on the supporting mass, in the provision of means for limiting expanding and compressive movements of the coupling element, and in the provision of means for preventing excessive tangential movements of the retaining members with respect to the coupling element or vice versa.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a vertical section through a suspension means embodying one form of my invention;

FIG. 2 is a horizontal section through the suspension means as seen in the direction of arrows from the line II—II of FIG. 1; and FIG. 3 is a fragmentary vertical section through a modified suspension means.

Referring now in greater detail to the illustrated embodiments, and first to FIGS. 1 and 2, there is shown a suspension means which is provided between a supporting member or supporting mass 2, e.g., the truck of a so-called swivel-truck running gear diesel locomotive, and a supported member or supported or sprung mass 1, such as the main frame of the locomotive. The suspension system comprises a weight transmitting member here shown as a laminated or leaf spring 3 which is disposed in a vertical plane parallel with the direction in which the locomotive advances and a readily separable elastic coupling element 4 which is interposed between the leaf spring 3 and the supported member 1.

The ends of the spring 3 are suspended on pendulum levers 5 whose upper ends are swingably fixed to the supporting member 2. Additional resilient elements, such as rubber springs 5a or suitable helical springs are preferably inserted between the free ends of the levers 5 and the supporting member 2 or the respective ends of the leaf spring. The clamp or band 6 of the spring 3 indirectly supports the coupling element 4 and hence the supported member 1.

The elastic element 4 consists of rubber or rubber-like material and is inserted between a pair of cup-shaped retaining members 7, 8. The purpose of the element 4 is to absorb compressive stresses and also to take up shearing or tangential stresses between the members 1 and 2. There is no positive connection between the element 4 on the one hand and the retaining members 7, 8 on the other hand. In the illustrated embodiment, the element 4 assumes the form of a horizontal disk having a central portion bounded by concave faces 10, 11 and an annular portion 9 which surrounds the biconcave central portion and is bounded by a pair of parallel horizontal faces and by a substantially cylindrical peripheral face 12. Alternately, it is often preferred to form the element 4 with an at least slightly convex (bulging) or at least slightly concave (channeled) peripheral face 12 in order to reduce surface tension when the element 4 is under load. The element 4 is further formed with a central through bore 13.

The centrally convex underside of the upper retaining member 7 abuts against the concave upper end face 10 and against the upper end face of the annular portion 9. The retaining member 7 further comprises a downwardly extending annular flange 14 which overlaps a portion of the peripheral face 12 and whose inner side 14' preferably assumes a conical shape so that it diverges downwardly and away from the element 4. There is a smooth transition between the inner side 14' of the flange 14 and the underside of the retaining member 7 to prevent damage to the element 4 when the latter is compressed and tends to expand radially outwardly toward the flange 14. The axial length of the flange 14 is preferably but a fraction of the height of the peripheral face 12.

The upper side of the retaining member 7 abuts against the underside of and is secured to a plate 15 at the lower end of a bracket 1a which latter is rigid with and thus forms part of the supported member 1. The underside of the plate 15 is formed with a recess 16 for a projection or boss 7a of the retaining member 7 which latter prevents lateral displacements of this retaining member in response to horizontal stresses. In addition, the member 7 is positively connected with the plate 15 by a plurality of screw bolts 17, e.g. four in number. In other words, the retaining member 7 is positively connected with the supported member 1 by means of the bracket 1a, the latter's plate 15, and the bolts 17.

The upper side of the lower retaining member 8 conforms to the configuration of the lower end face of the element 4, and the member 8 is formed with an upwardly extending annular flange 14a whose configuration preferably equals that of the flange 14. The underside of the member 8 rests on the flat upper side of the clamp 6 and is rigidly secured thereto by welding or in any other suitable way. In order to insure a satisfactory transfer of stresses to the clamp 6 and to insure that the member 8 is properly supported by the supporting member 2, the connection between the member 8 and the clamp 6 preferably comprises a series of substantially triangular ribs or webs 18 which are welded thereto. The parts 5, 5a and 3 together constitute two components of a composite carrier for the lower retaining member 8.

At least one of the retaining members, e.g. the member 8, is provided with a concentric projection or pin 19 which is loosely received in the bore 13 of the coupling element 4. The axial length of this pin is selected in such a way that its exposed upper end face abuts against the underside of the retaining member 7 when the element 4 is subjected to maximum permissible compression, i.e. the pin 19 serves as a means for preventing excessive compression and eventual destruction of the coupling element. In addition, the pin 19 may transmit horizontal stresses between the element 4 and the retaining member 8. The provision of the pin 19 is of particular advantage in such types of suspension means which provide a rigid connection between a supporting member and a supported member when the interposed resilient part or parts are deformed all the way to the limit of their resiliency.

FIG. 3 illustrates a modified suspension means wherein the pin 19 is replaced by an elongated connecting member in the form of a bolt 20. The larger-diameter lower end or boss of this bolt is concentrically anchored in the lower retaining member 8 and the bolt thereupon extends through the bore 13 of the elastic coupling element 4, through a coaxial bore 23 of the upper retaining member 7 and through a bore 24 of the plate 15 to have its externally threaded upper end 21 engaged by a collar or flange nut 22. The nut 22 is sufficiently spaced from the upper side of the plate 15 to permit axial movements of the retaining members 7, 8 with respect to each other to the extent necessary to take full advantage of the resiliency of the coupling element 4. The lateral play of the bolt 20 in the bores 23, 24 exceeds the maximum permissible lateral displacement of the retaining members 7, 8 with respect to the coupling element 4. The nut 22 further serves as a means for adjusting the maximum permissible axial play between the retaining members.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. In a rail-mounted vehicle, particularly in a locomotive, in combination, a rail-mounted truck; a main frame having a first and a second side, as viewed in the direction of movement of the vehicle; an elongated weight transmitting member extending in the direction of movement of the vehicle and having two spaced end portions; connecting means comprising a pair of pendulum levers each secured to one end portion of said weight transmitting member and each articulately suspended on said truck so that the weight transmitting member is movable back and forth with respect to the truck in directions parallel with the direction of movement of the vehicle; a first cup shaped retaining member rigidly connected to a central portion of and extending upwardly from said weight transmitting member; a second cup shaped retaining member located above said first retaining member; means providing a rigid connection between said main frame and said second retaining member; a pin extending centrally from one of said retaining members in a direction toward the other retaining member; and a biconcave disk-shaped elastic element of rubber-like material received between said retaining members and having a thickness sufficient to normally maintain said retaining members out of actual contact with each other, each of said retaining members having a convex portion in full face-to-face abutment with said elastic element and said elastic element being arranged to take up axial as well as shearing stresses between said retaining members and having a central bore loosely receiving said pin, said weight transmitting member and said levers together constituting two components of a carrier for said first retaining member and at least one of said components being resiliently yieldable in response to stresses transmitted by said elastic element.

2. In a rail-mounted vehicle, particularly in a locomotive, in combination, a rail-mounted truck; a main frame having a first and a second side, as viewed in the direction of movement of the vehicle; an elongated weight transmitting member extending in the direction of movement of the vehicle and having two spaced end portions; connecting means comprising a pair of pendulum levers each secured to one end portion of said weight transmitting member and each articulately suspended on said truck so that the weight transmitting member is movable back and forth with respect to the truck in directions parallel with the direction of movement of the vehicle; a first cup shaped retaining member rigidly connected to a central portion of and extending upwardly from said weight transmitting member; a second cup shaped retaining member located above said first retaining member; means providing a rigid connection between said main frame and said second retaining member; and a bi-concave disc-shaped elastic element of rubber-like material received between said retaining members and having a thickness sufficient to normally maintain said retaining members out of actual contact with each other, each of said retaining members having a convex portion in full face to face abutment with said elastic element and said elastic element being arranged to take up axial as well as shearing stresses between said retaining members, said weight transmitting member and said levers together constituting two components of a carrier for said first retaining member and at least one of said components being resiliently yieldable in response to stresses transmitted by said elastic element.

3. In a rail-mounted vehicle, in combination, a rail-mounted truck; a main frame having a first and a second side, as viewed in the direction of movement of the vehicle; an elongated weight transmitting member extending in the direction of movement of the vehicle and having two spaced portions; connecting means comprising a pair of pendulum levers each secured to one end portion of said weight transmitting member and each articulately suspended on said truck so that the weight transmitting member is movable back and forth with respect to said truck in directions parallel with the direction of movement of the vehicle; a first and a second retaining member respectively rigid with one side of the main frame and with said weight transmitting member intermediate said spaced portions thereof; and a resilient coupling element disposed intermediate and arranged to take up compressive and tangential stresses between said retaining members, said weight transmitting member and said connecting means together constituting a carrier for said second retaining member and at least one thereof being resiliently yieldable in response to stresses transmitted by said elastic element.

References Cited in the file of this patent

UNITED STATES PATENTS

| | | |
|---|---|---|
| 25,100 | De Forest | Aug. 16, 1859 |
| 28,703 | Vose | June 12, 1860 |
| 39,314 | Vose | July 21, 1863 |
| 49,560 | Shaw | Aug. 22, 1865 |
| 316,306 | Sterne | Apr. 21, 1885 |
| 506,907 | Godley | Oct. 16, 1893 |
| 1,540,500 | Reed | June 2, 1925 |
| 1,607,307 | Robbin | Nov. 16, 1926 |
| 1,698,006 | Steele | Jan. 8, 1929 |
| 1,797,858 | Froesch | Mar. 29, 1931 |
| 1,885,090 | Elliott et al. | Oct. 25, 1932 |
| 2,112,851 | Letzerich | Apr. 5, 1938 |
| 3,032,370 | Moore | May 1, 1962 |

FOREIGN PATENTS

| | | |
|---|---|---|
| 383,254 | France | Mar. 2, 1908 |
| 598,551 | France | Dec. 19, 1925 |
| 633,373 | France | Jan. 27, 1928 |
| 196,154 | Great Britain | Apr. 17, 1923 |
| 816,042 | Great Britain | July 8, 1959 |
| 577,956 | Italy | June 16, 1958 |